US010941696B2

(12) United States Patent
Aratake et al.

(10) Patent No.: US 10,941,696 B2
(45) Date of Patent: Mar. 9, 2021

(54) ENGINE COVER AND WORK VEHICLE

(71) Applicant: Kubota Corporation, Osaka (JP)

(72) Inventors: Seigi Aratake, Sakai (JP); Kozo Kitagawa, Sakai (JP); Takahiro Miyasaka, Sakai (JP); Koji Kashiwase, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/434,404

(22) Filed: Jun. 7, 2019

(65) Prior Publication Data
US 2020/0003109 A1 Jan. 2, 2020

(30) Foreign Application Priority Data

Jun. 27, 2018 (JP) .............................. JP2018-121686
Sep. 20, 2018 (JP) .............................. JP2018-176491
Jan. 28, 2019 (JP) .............................. JP2019-012228

(51) Int. Cl.
*B60K 13/04* (2006.01)
*F01P 9/00* (2006.01)

(52) U.S. Cl.
CPC ................ *F01P 9/00* (2013.01); *B60K 13/04* (2013.01); *F01P 2060/16* (2013.01)

(58) Field of Classification Search
CPC .................................. B60K 13/04; B60K 5/02
See application file for complete search history.

(56) References Cited

U.S. PATENT DOCUMENTS

| | | | |
|---|---|---|---|
| 6,438,949 B1* | 8/2002 | Nozaki | B60K 13/04 123/184.21 |
| 2009/0178880 A1 | 7/2009 | Uemura et al. | |
| 2010/0275588 A1* | 11/2010 | Kamata | E02F 9/0866 60/322 |
| 2011/0094818 A1* | 4/2011 | Suzuki | B60K 5/02 180/292 |
| 2011/0108349 A1* | 5/2011 | McClendon | B62J 35/00 180/311 |
| 2013/0048406 A1 | 2/2013 | Kuramoto | |
| 2013/0048407 A1* | 2/2013 | Kuramoto | B60K 5/02 180/292 |
| 2014/0070569 A1 | 3/2014 | Schmitz et al. | |
| 2014/0345964 A1* | 11/2014 | Nakaoka | B60K 5/04 180/291 |
| 2016/0017778 A1 | 1/2016 | Sandou et al. | |
| 2016/0061088 A1* | 3/2016 | Minnichsoffer | F16H 57/027 180/309 |
| 2017/0001508 A1* | 1/2017 | Bessho | B60K 17/08 |
| 2017/0096795 A1* | 4/2017 | Takami | E02F 9/0883 |
| 2017/0218808 A1 | 8/2017 | Kurokawa et al. | |
| 2017/0218832 A1 | 8/2017 | Kurokawa et al. | |

(Continued)

FOREIGN PATENT DOCUMENTS

EP 3208126 A1 8/2017
JP 2012184602 A 9/2012

(Continued)

*Primary Examiner* — Erez Gurari
(74) *Attorney, Agent, or Firm* — The Webb Law Firm

(57) ABSTRACT

An engine cover capable of appropriately covering the upper side of an engine is provided. An engine cover is provided with a plate member installed above an engine, and the plate member is provided with a reinforcement structure for increasing the torsional rigidity of the plate member.

5 Claims, 13 Drawing Sheets

(56) References Cited

U.S. PATENT DOCUMENTS

| | | | | |
|---|---|---|---|---|
| 2018/0154765 A1* | 6/2018 | Oyama | ................... | B60K 5/12 |
| 2020/0003109 A1* | 1/2020 | Aratake | ................. | B60K 13/04 |
| 2020/0047606 A1* | 2/2020 | Nomura | ................. | F01N 13/08 |

FOREIGN PATENT DOCUMENTS

| JP | 201343481 A | 3/2013 |
|---|---|---|
| JP | 2014177914 A | 9/2014 |
| JP | 201678827 A | 5/2016 |

* cited by examiner

ENGINE COVER AND WORK VEHICLE

CROSS-REFERENCE TO RELATED APPLICATIONS

This application claims priority to Japanese Patent Application Nos. 2018-121686, 2018-176491, and 2019-012228, filed Jun. 27, 2018, Sep. 20, 2018, and Jan. 28, 2019, respectively, the disclosures of which are hereby incorporated by reference in their entirety.

BACKGROUND OF THE INVENTION

1. Field of the Invention

The present invention relates to an engine cover and a work vehicle.

2. Description of the Related Art (1) Conventionally, there are an engine cover provided above an engine and a work vehicle provided with this engine cover.

Patent Document 1 describes a multipurpose work vehicle used for multipurpose applications such as luggage transportation and recreation. In this multipurpose work vehicle, a loading platform on which luggage is to be placed is installed at the rear. Also, an engine, an exhaust pipe that guides exhaust gas exhausted from the engine, and the like are installed below the loading platform.

(2) Conventionally, there is a work vehicle in which an engine configured using an internal combustion engine, and an exhaust gas treatment device, are disposed in a motive portion.

As this type of work vehicle, there exists the related art described in [1] below.

[1] A mounting frame is provided at a position above an engine in an engine room, and the mounting frame supports an exhaust gas treatment device. A heat shielding plate positioned between the exhaust gas treatment device and an air cleaner is provided directed obliquely downward from the mounting frame, and thereby propagation of radiant heat from the exhaust gas treatment device to the air cleaner is suppressed (see Patent Document 2).

RELATED ART DOCUMENTS

Patent Documents

Patent Document 1: JP 2013-43481A
Patent Document 2: JP 2014-177914A

SUMMARY OF THE INVENTION

1. Problems to be Solved by Invention (1) There are problems corresponding to the related art (1) as described below.

In a work vehicle as described in Patent Document 1, it is preferable to cover high temperature components, such as the engine installed below the loading platform and an exhaust pipe in the vicinity of the engine, by some method. By adopting such a configuration, even if, for example, plants or the like stacked on the loading platform fall downward, the plants or the like are unlikely to contact the high temperature components.

Also, it is preferable to cover the engine, and a fan belt and electrical components such as an ignition device installed in the vicinity of the engine, by some method. By adopting such a configuration, even in a case where the work vehicle is used when it is raining or a case where the work vehicle is used in a location where water or mud gets on the work vehicle, the water or mud is unlikely to get on the fan belt or the electric components.

The present invention has been made in view of the above problems, and it is an object thereof to provide an engine cover capable of appropriately covering the upper side of an engine, and a work vehicle provided with the engine cover.

(2) There are problems corresponding to the related art (2) as described below.

In the configuration described in [1] above, the heat shielding plate is provided between the exhaust gas treatment device and the air cleaner, so this configuration is useful for being able to suppress propagation of radiant heat from the exhaust gas treatment device to the air cleaner. However, because a dedicated mounting frame for supporting the exhaust gas treatment device is provided, and the heat shielding plate is also provided separately from the mounting frame, there is a problem that the structure of this configuration is likely to become comparatively large.

The present invention is intended to reduce the influence of heat of the exhaust gas treatment device on other devices, while avoiding an increase in the size of the support structure of the exhaust gas treatment device.

2. Solutions (1) The Solutions corresponding to the problems in (1) are addressed as described below.

In a characteristic configuration of an engine cover according to the present invention for achieving the above object, the engine cover includes a plate member installed above an engine, and the plate member is provided with a reinforcement structure for increasing the torsional rigidity of the plate member.

According to the above characteristic configuration, because the engine cover is provided above the engine, the engine cover can receive plants, water, and the like falling from above. That is, plants or the like that have fallen are unlikely to contact the engine or components in the vicinity of the engine, which are positioned below the engine cover. Also, by providing the reinforcement structure in the plate member that constitutes the engine cover, it is possible to eliminate uniform and significant bending of the entire plate member that constitutes the engine cover when a force is applied to the engine cover.

Accordingly, it is possible to provide an engine cover capable of appropriately covering the upper side of an engine.

In another characteristic configuration of an engine cover according to the present invention, the reinforcement structure has an uneven portion that is at least any one of a recessed portion and a protruding portion that extend linearly and are formed in a surface of the plate member.

According to the above characteristic configuration, by providing the linearly shaped uneven portion formed by press processing or the like in the surface of the plate member, it is possible to eliminate uniform and significant bending of the entire plate member.

In still another characteristic configuration of an engine cover according to the present invention, the plate member has a horizontal portion positioned above the engine, and a downward portion extending downward from the horizontal portion, toward the vicinity of a fan belt of a cooling fan provided adjacent to the engine and driven by power of the engine.

According to the above characteristic configuration, with the horizontal portion, it is possible to receive plants, water, and the like that have fallen from above. In addition, with the downward portion, it is possible to prevent a finger or the like of a person who performs maintenance from approaching a fan belt from the vicinity of the engine cover.

In still another characteristic configuration of an engine cover according to the present invention, at a predetermined location in a peripheral edge portion of the plate member, there is provided an upward peripheral edge portion having a shape in which the peripheral edge portion is bent upward.

According to the above characteristic configuration, water droplets and the like existing on the plate member are less likely to spill down from the portion where the upward peripheral edge portion is provided. As a result, it is possible a circumstance where water gets on components existing below the engine cover.

In still another characteristic configuration of an engine cover according to the present invention, the upward peripheral edge portion is configured in a shape that contacts another constituent member that is adjacent.

According to the above characteristic configuration, it is possible to eliminate the gap between the engine cover and other constituent members adjacent to the engine cover. As a result, water droplets or the like existing on the plate member can be prevented from spilling down from the portion where the upward peripheral edge portion is provided.

In a characteristic configuration of a work vehicle according to the present invention, an engine cover is provided above the engine.

According to the above characteristic configuration, it is possible to provide a work vehicle provided with an engine cover capable of appropriately covering the upper side of an engine.

(2) The Solutions corresponding to the problems in (2) are addressed as described below.

In order to address the above-described problems, a work vehicle includes a motive portion having an engine and an exhaust gas treatment device connected to an exhaust manifold of the engine, the exhaust gas treatment device is connected to a fixing portion integrated with the engine through a mounting support, and the mounting support is provided with a mounting portion connectable to the fixing portion, a connecting portion that connects the exhaust gas treatment device, and a heat shielding plate that suppresses conduction of radiant heat between the fixing portion and the exhaust gas treatment device.

According to the present invention, the mounting support of the exhaust gas treatment device is provided with the mounting portion connectable to the fixing portion, and the connecting portion of the exhaust gas treatment device, and is also provided with the heat shielding plate that suppresses conduction of radiant heat between the fixing portion and the exhaust gas treatment device.

As described above, because the mounting support itself for supporting the exhaust gas treatment device is provided with the heat shielding plate, it is not necessary to mount a member dedicated to heat shielding separately from the mounting support. Therefore, while reducing the thermal effects of the exhaust gas treatment device on other devices on the fixing portion side, the installation of the exhaust gas treatment device and the structure for performing heat shielding to other devices are made comparatively compact, and there is no need to separately assemble and disassemble a heat shielding member.

Consequently, it is possible to avoid upsizing of the structure for mounting and heat shielding, and to save man-hours for assembly and disassembly.

In the above configuration, it is suitable for the motive portion to be provided between a vehicle frame supported by a traveling device, a driving portion disposed to a front side above the vehicle frame, and a loading platform disposed to a rear side of the driving portion above the vehicle frame.

According to this configuration, by using the heat shielding member, it is not necessary to provide the exhaust gas treatment device at a large distance upward from the fixing portion on the engine side, and the vertical height of the motive portion including the exhaust gas treatment device can easily be formed in a comparatively low height. Therefore, this configuration is easily applied to a vehicle provided with the loading platform on the vehicle frame, and provided with the motive portion whose height in the vertical direction is restricted to a low height.

In the above configuration, it is suitable that the engine is disposed at the front of the motive portion, and a transmission is installed in a continuous manner to the rear of the engine, the exhaust gas treatment device is disposed above the transmission at a position to the rear away from the engine, and the mounting support is attached to the transmission.

According to this configuration, the exhaust gas treatment device is disposed at a position to the rear away from the engine and above the transmission installed in a continuous manner to the rear of the engine. Also, the mounting support is attached to the transmission.

Thus, because the exhaust gas treatment device is disposed at a position to the rear away from the engine, heat transmission from the engine to the exhaust gas treatment device is unlikely to occur, and heat transfer from the exhaust gas treatment device to the transmission has little effect on the transmission side because the heat shielding plate is provided in the mounting support.

In the above configuration, it is suitable that the exhaust gas treatment device is disposed such that a longitudinal direction of the exhaust gas treatment device lies along a front-rear direction, a front end portion of the exhaust gas treatment device is connected to the exhaust manifold by an exhaust gas inlet pipe along the front-rear direction, and the bottom of the exhaust gas treatment device is supported by the mounting support in a state where the heat shielding plate faces a lower half side of the exhaust gas treatment device.

According to this configuration, the front end portion of the exhaust gas treatment device disposed such that the longitudinal direction of the exhaust gas treatment device lies along the front-rear direction is connected to the exhaust manifold by the exhaust gas inlet pipe along the front-rear direction, so the position of the exhaust gas treatment device mainly in the front-rear direction due to engine vibration, vehicle sway, or the like is easily restricted using the rigidity of the exhaust gas inlet pipe itself along the front-rear direction. Also, the position of the exhaust gas treatment device in the left-right direction and the vertical direction is restricted by the mounting support that supports the bottom of the exhaust gas treatment device, and therefore the exhaust gas treatment device is reliably supported.

As a result, even if the exhaust gas treatment device is comparatively long, the exhaust gas treatment device can be supported in a state where the position of the exhaust gas treatment device is reliably regulated in the front, rear, left, right, and vertical directions, without needing to form the mounting support at a corresponding length in the front-rear direction.

In the above configuration, it is suitable that the exhaust gas treatment device is provided with a silencing device.

According to this configuration, it is possible to support an exhaust gas treatment device provided with a silencing device.

DETAILED DESCRIPTION OF PREFERRED EMBODIMENTS

First Embodiment

A work vehicle provided with an engine cover 40 according to an embodiment of the present invention will be described below with reference to the drawings.

Figure 1:
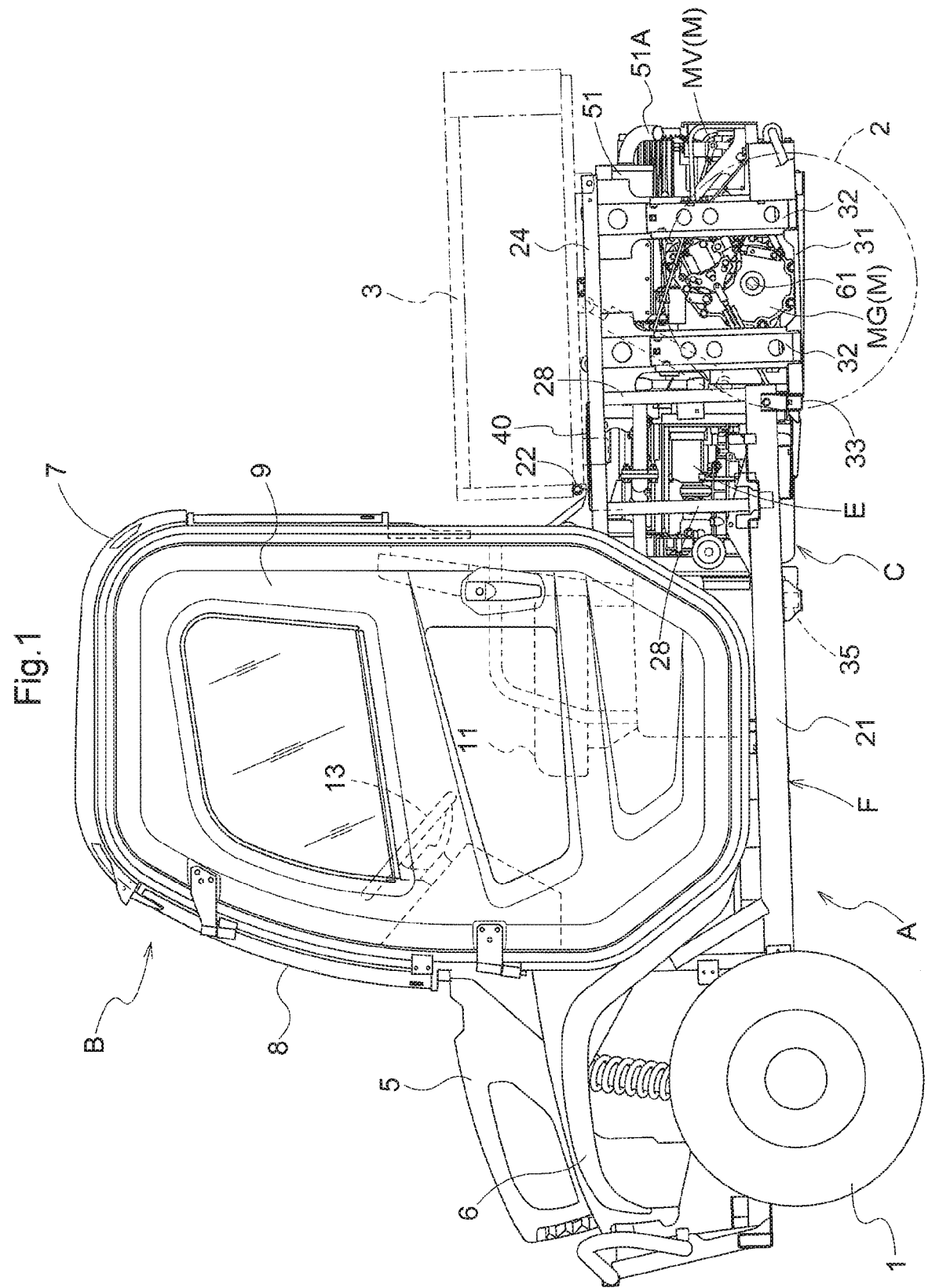
FIG. 1 shows a first embodiment (the same below through FIG. 5), and is an overall side view of a work vehicle.
Figure 2:
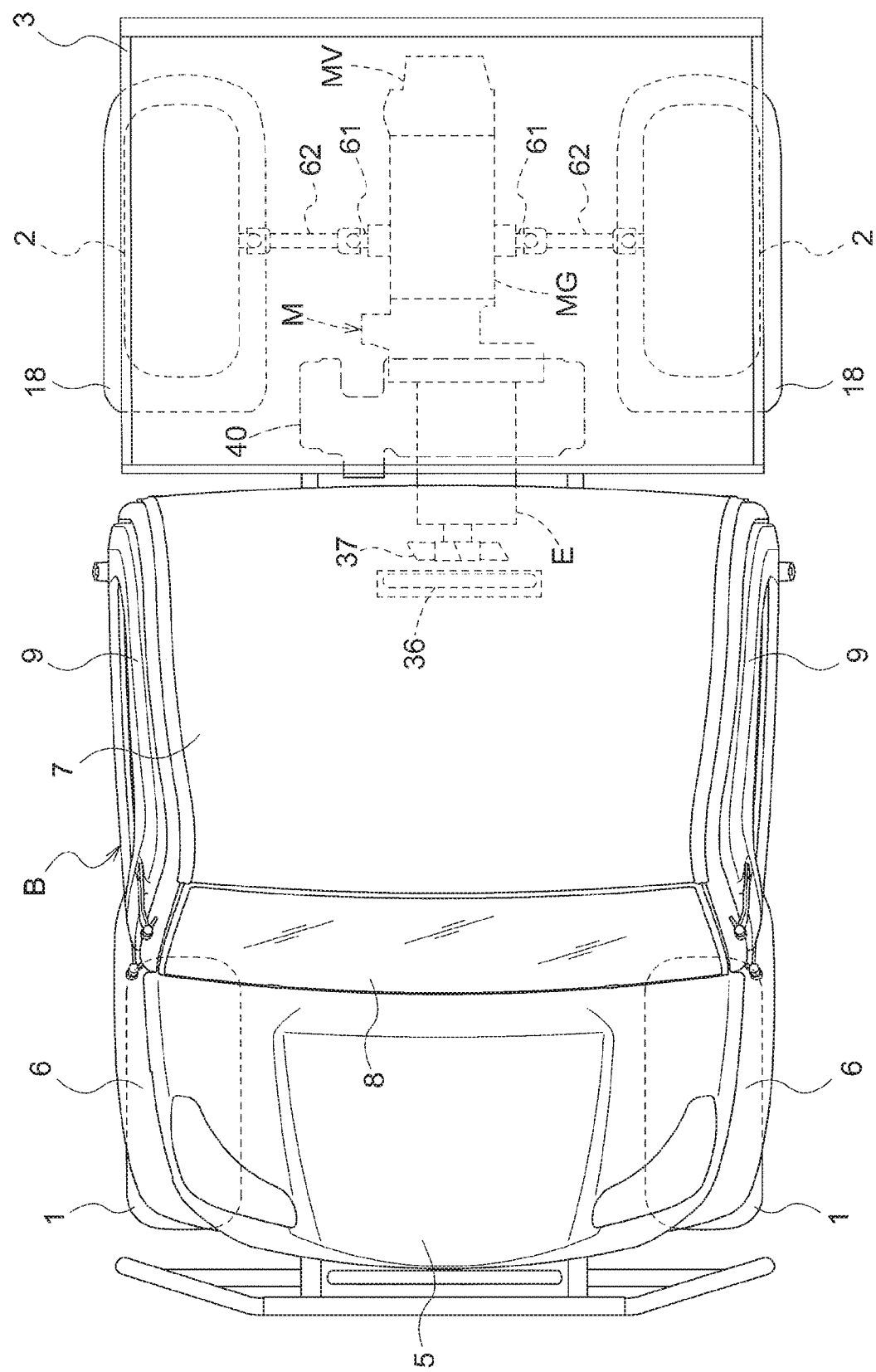
FIG. 2 shows an overall plan view of the work vehicle.

FIG. 1 shows an overall side view of the work vehicle. FIG. 2 shows an overall plan view of the work vehicle. A multipurpose work vehicle, serving as an example of the work vehicle shown in FIG. 1, is a work vehicle used for multipurpose applications such as luggage transportation and recreation. As shown, the work vehicle is provided with a left-right pair of front wheels 1 capable of steering operation, and a left-right pair of rear wheels 2, on a traveling vehicle A. In addition, a cabin B that constitutes a driving portion is provided at a position toward the front of the traveling vehicle A, a loading platform 3 is provided at the rear of the traveling vehicle A, and a driving unit C is provided at a position below the loading platform 3.

For example, this work vehicle is a four-wheel drive type vehicle having a traveling drive system that transmits driving force from the driving unit C to the front wheels 1 and the rear wheels 2, and is configured as a multipurpose work vehicle used for multipurpose work such as farming and transportation.

A hood 5 is provided at a position toward the front of the traveling vehicle A so as to be capable of opening/closing, and a front fender 6 that covers an upper portion of the front wheels 1 is disposed below left and right portions of the hood 5. The cabin B includes a windshield 8 at the front of a cabin body 7, and a door 9 provided so as to be capable of opening/closing from the side of the cabin B.

A rear fender 18 covering the upper portion of the left and right rear wheels 2 is provided at the rear end side of the traveling vehicle A.

The cabin B is provided with a driver seat 11 where a driver sits, and a passenger seat (not shown) is provided at a position adjacent to the driver seat 11. Further, a steering wheel 13 or the like that controls steering of the front wheels 1 is provided at a position in front of the driver seat 11. Although not shown, an accelerator pedal serving as a speed change controller that controls traveling speed, a brake pedal that operates a braking device of the front wheels 1 and the rear wheels 2, and the like are also provided at a position in front of the driver seat 11.

The work vehicle is provided with a vehicle frame F as a strengthening member of the traveling vehicle A. The vehicle frame F includes a left-right pair of main frames 21 extending in the front-rear direction, and a left-right pair of upper frames 24 that extend in the front-rear direction of the traveling vehicle A so as to have an attitude parallel to the main frames 21 at a position above a position to the rear of the main frames 21, for example. Also, the vehicle frame F is provided with a portion supporting the cabin B at a position in front of the main frames 21, a portion supporting the driving unit C, and the like. For example, the main frames 21 and the upper frames 24 are configured using a square pipe-shaped steel material. The left and right main frames 21 and the upper frames 24 disposed above the main frames 21 are connected by a connecting frame 28 made of a square pipe-shaped steel material in a vertically directed attitude.

In the present embodiment, the driving unit C has a configuration in which an engine E serving as a drive source is connected to a transmission case M. The transmission case M is configured to connect a transmission gear case MG and a continuously variable transmission MV. A mounting frame 31 is disposed on the lower side (the side below the upper frames 24) of the driving unit C. Vertical frames 32 having a U-shaped cross-section are provided, two on the left and right sides respectively, so as to connect the mounting frame 31 to the left and right upper frames 24, and a front frame 33 formed at the front end side of the mounting frame 31 is provided in an attitude directed laterally.

The mounting frame 31 has a rib-like portion formed by pressing a steel plate or the like to increase strength, and the width of this portion is set to be shorter than the distance between the left and right upper frames 24. Further, in order to linearly connect both ends of the mounting frame 31 and the upper frames 24 by the vertical frames 32, the left and right vertical frames 32 are provided in an inclined attitude displaced toward the outside of the vehicle as much as the upper end side.

In the present embodiment, the driving unit C is configured with the engine E, the transmission gear case MG, and the continuously variable transmission MV integrated as a single body, by connecting the engine E, the transmission gear case MG, and the continuously variable transmission MV in this order.

Although the internal structure of the transmission gear case MG is not shown in the drawings, the transmission gear case MG performs gear shifting of the driving force shifted by the continuously variable transmission MV in multiple steps, and built into the transmission gear case MG there are a gear type transmission that switches between forward and reverse gears, and a differential gear (not shown).

The continuously variable transmission MV includes, for example, an axial plunger type variable displacement hydraulic pump operated by driving force from the engine E, and an axial plunger type hydraulic motor rotated by hydraulic oil supplied from the hydraulic pump. In this driving unit C, a transmission system is configured in which the engine E is provided in an attitude in which the axis of an output shaft (a crankshaft: not shown) of the engine E is set in the front-rear direction, and a transmission shaft (not shown) that connects to that output shaft passes through the transmission gear case MG in the front-rear direction, so that driving force of the engine E is transmitted to the hydraulic pump of the continuously variable transmission MV, and this driving force from the hydraulic pump of the continuously variable transmission MV is transmitted to the transmission gear case MG.

In the transmission gear case MG, the driving force of the engine E is shifted by the transmission and transmitted from the differential gear to left and right rear output shafts 61, and transmitted from the rear output shafts 61 to the left and right rear wheels 2 through a rear wheel drive shaft 62. Also, the transmission system is configured such that output of the transmission gear case MG is transmitted from a drive shaft (not shown) to a front wheel differential gear (not shown), and further is transmitted from a front wheel drive shaft (not shown) to the left and right front wheels 1.

Figure 3:
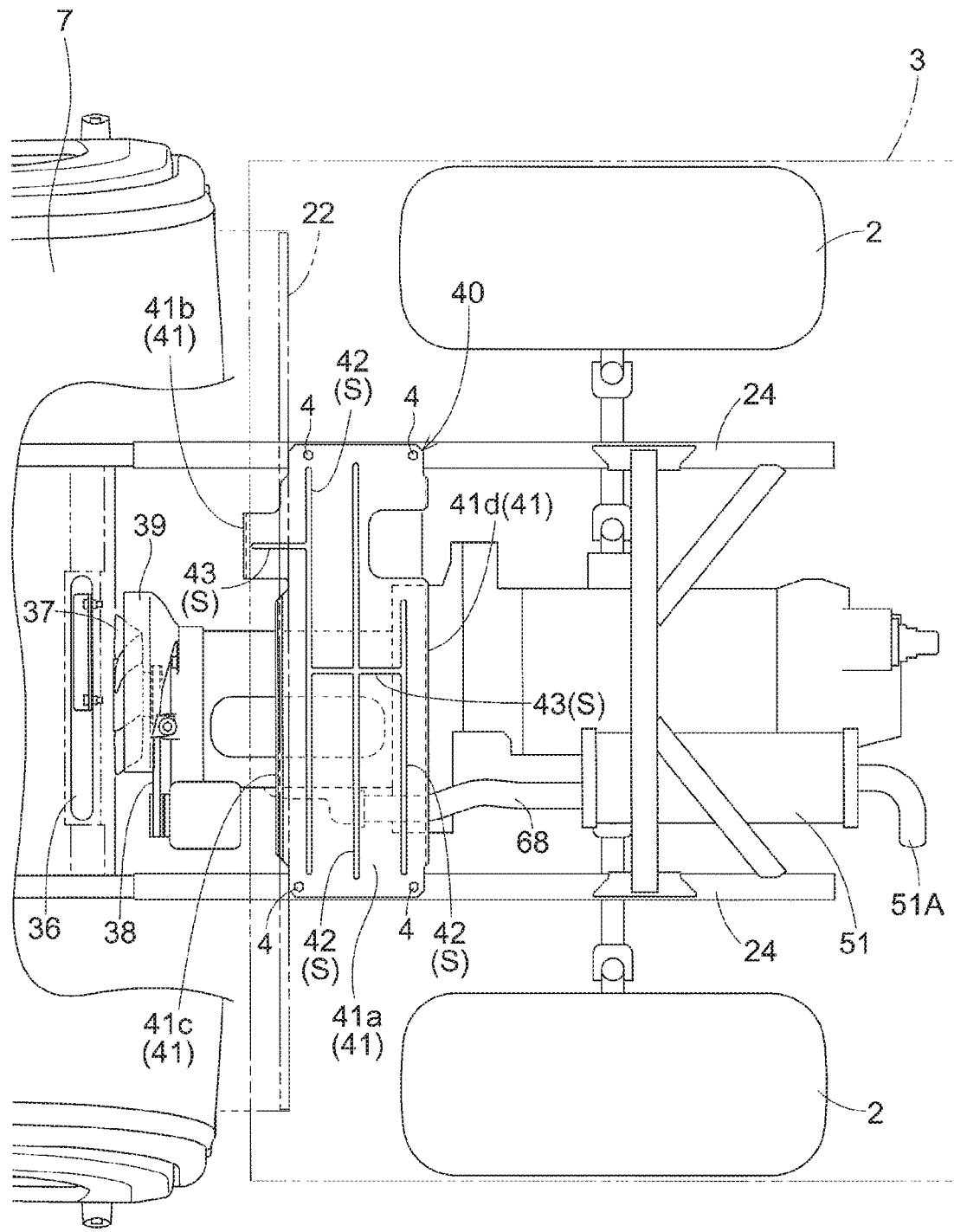
FIG. 3 shows a plan view illustrating the positional relationship between an engine cover and an engine.
Figure 4:
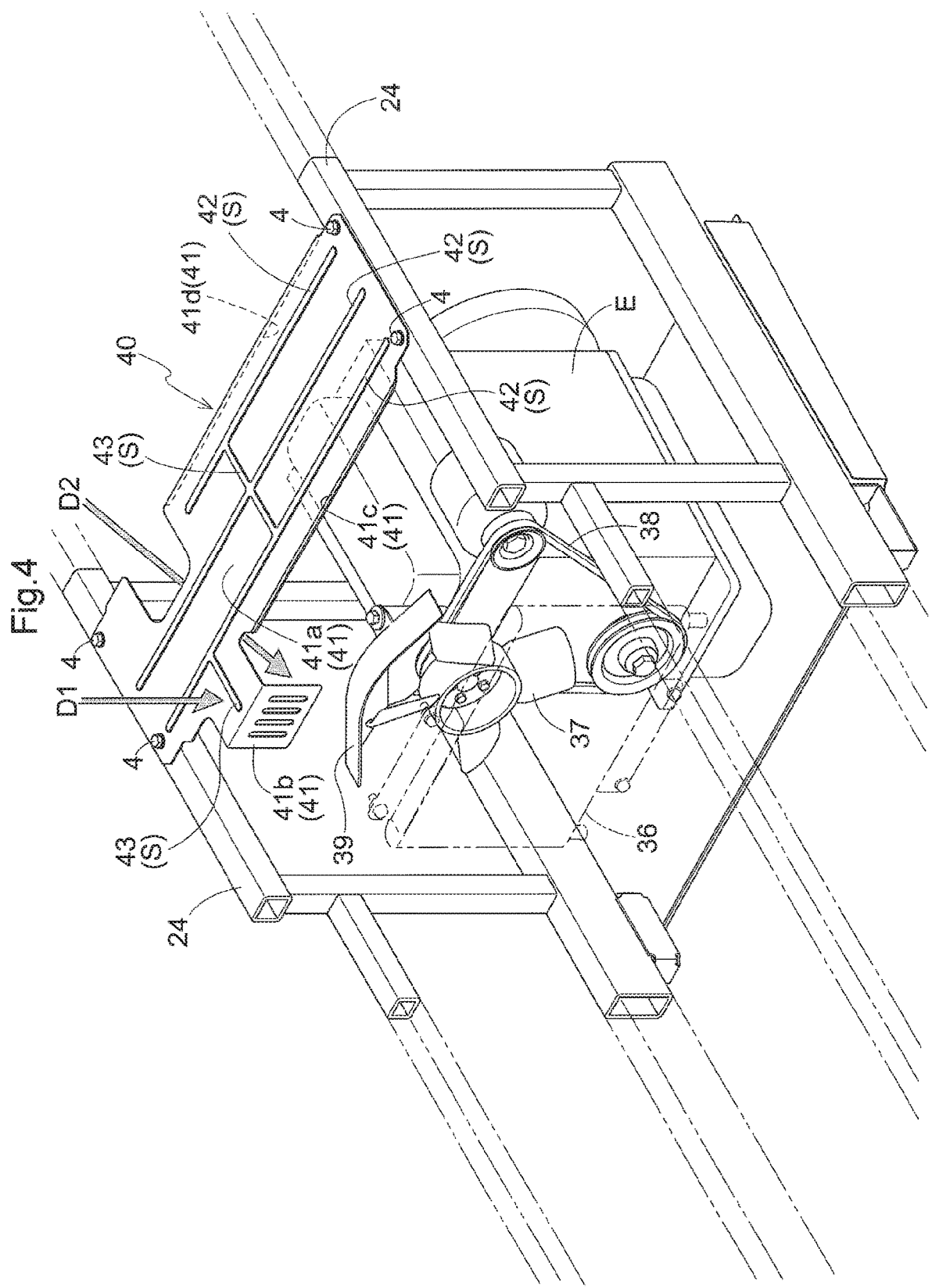
FIG. 4 shows a perspective view illustrating the positional relationship between the engine cover and the engine.
Figure 5:
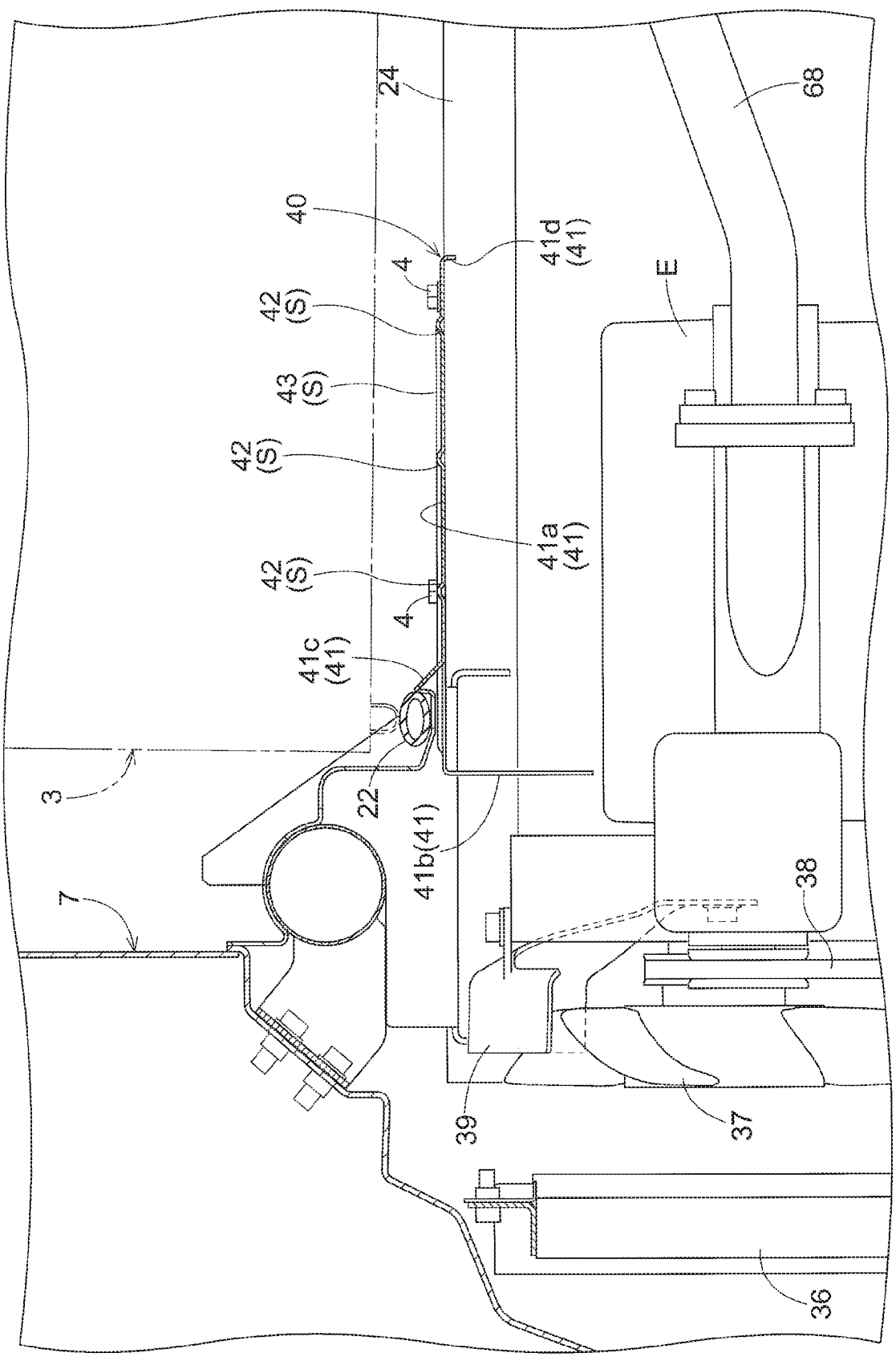
FIG. 5 shows a partial cross-sectional view illustrating the positional relationship between the engine cover and the engine.

The engine cover 40 is provided above the engine E. FIG. 3 shows a plan view illustrating the positional relationship between the engine cover 40 and the engine E. FIG. 4 shows a perspective view illustrating the positional relationship between the engine cover 40 and the engine E. FIG. 5 shows a partial cross-sectional view illustrating the positional relationship between the engine cover 40 and the engine E. Exhaust gas exhausted from the engine E is introduced into a muffler 51 for reducing the exhaust noise of the engine E through an exhaust manifold (not shown) and an exhaust pipe 68. The muffler 51 is formed in a cylindrical shape, and is provided with a cylindrical exhaust portion 51A bent at the rear end so as to send the exhaust gas downward on the left side.

As shown in FIG. 2 and the like, an oil cooler 36 for cooling hydraulic oil and the like used in the continuously variable transmission MV is provided on the front side of the engine E. A cooling fan 37 for blowing air onto the oil cooler 36 to perform cooling is provided between the oil cooler 36 and the engine E. The cooling fan 37 is driven by a fan belt 38 rotated by the driving force of the engine E. A fan belt cover 39 is provided above and to the sides of the cooling fan 37 and the fan belt 38.

The engine cover 40 provided above the engine E is provided with a plate member 41 provided above the engine E, and the plate member 41 is provided with a reinforcement structure S for increasing the torsional rigidity of the plate member 41. The engine cover 40 is fixed to the upper frames 24 by bolts 4.

The reinforcement structure S has uneven portions 42 and 43, which are at least any one of a recessed portion and a protruding portion formed extending linearly in the face of the plate member 41. The uneven portions 42 and 43 are formed, for example, in a curved shape such as a semicircular cross-section by performing press processing or the like on the plate member 41. In particular, the reinforcement structure S of the present embodiment is formed in a state in which a plurality of the linearly extending uneven portions 42 and 43 intersect each other at right angles. By providing the uneven portions 42 and 43 as this sort of reinforcement structure S, it is possible to eliminate uniform and significant bending of the entire plate member 41 that constitutes the engine cover 40 when a force is applied to the engine cover 40.

The plate member 41 constituting the engine cover 40 has a horizontal portion 41a positioned above the engine E, and a downward portion 41b extending downward from the horizontal portion 41a, toward the vicinity of the fan belt 38 of the cooling fan 37 provided adjacent to the engine E and driven by the power of the engine E. The uneven portions 42 and 43 described above are provided in the horizontal portion 41a of the plate member 41.

By adopting such a configuration, the horizontal portion 41a can receive plants, water, and the like falling from above. As a result, plants or the like that have fallen are unlikely to contact the high temperature engine E, components in the vicinity of the engine E, or the like. In addition, even in a case where the work vehicle is used when it is raining or a case where the work vehicle is used in a location where water or mud gets on the work vehicle, the water or mud is unlikely to get on the engine E, the fan belt 38, or electrical components such as an ignition device installed in the vicinity of the engine E.

In the present embodiment, the engine cover 40 can prevent a finger or the like of a person who performs maintenance on the cooling fan 37 and the fan belt 38 from approaching. For example, the engine cover 40 is provided with the downward portion 41b, whereby even if a human finger or the like intrudes in the direction of arrow D2 in FIG. 4, this finger is prevented from approaching the cooling fan 37 and the fan belt 38. In particular, even if a hole or the like is provided in the fan belt cover 39 provided above and to the sides of the cooling fan 37 and the fan belt 38, a finger or the like of a person who performs maintenance on the cooling fan 37 and the fan belt 38 can be prevented from approaching the cooling fan 37 and the fan belt 38 by the downward portion 41b of the engine cover 40. Also, even if a human finger or the like intrudes in the direction of arrow D1 in FIG. 4, this finger is prevented from approaching the cooling fan 37 and the fan belt 38 by the engine cover 40.

At a predetermined location in the peripheral edge portion of the plate member 41 of the engine cover 40, there is provided an upward peripheral edge portion 41c having a shape in which the peripheral edge portion is bent upward. In the present embodiment, the peripheral edge portion on the front side (the front side of the work vehicle) of the engine cover 40 is the upward peripheral portion 41c. By providing such an upward peripheral edge 41c on the engine cover 40, even if water or the like adheres to the top of the engine cover 40, this water is unlikely to spill down from the front side peripheral edge portion (the upward peripheral edge portion 41c). As a result, the water does not spill down toward the fan belt 38 or the electrical components or the like disposed on the front side of the engine cover 40. In particular, as shown in FIG. 5, the upward peripheral edge portion 41c of the engine cover 40 of the present embodiment is configured with a shape that contacts another adjacent member (a constituent member 22). Therefore, not only does the peripheral edge portion on the front side of the engine cover 40 serve as the upward peripheral edge portion 41c, but a gap existing on the front side of the engine cover 40 is mostly eliminated. Therefore, it is possible to reliably prevent water from spilling down from the top of the engine cover 40 to the fan belt 38 or the electrical components or the like disposed on the front side.

In addition, at a predetermined location in the peripheral edge portion of the plate member 41 of the engine cover 40, there is provided a downward peripheral edge portion 41d having a shape in which the peripheral edge portion is bent downward. In the present embodiment, the peripheral edge portion on the rear side (the rear side of the work vehicle) of the engine cover 40 is the downward peripheral edge portion 41d. Therefore, even if water droplets or the like adhere on the engine cover 40, they can selectively drop from the rear side of the engine cover 40.

Other Embodiments

1. In the above embodiment, the engine cover 40 and the work vehicle provided therewith according to the present invention are described as an example, but their configurations can be appropriately modified.

For example, the size, shape, or the like of the engine cover 40 can be appropriately modified according to the size or the like of the engine E, other members, or the like.

Also, the number, length, cross-sectional shape, or the like of the linear uneven portions 42 and 43 formed in the plate member 41 constituting the engine cover 40 can be appropriately modified.

In addition, in the above embodiment, an example is described in which the reinforcement structure S is formed in a state in which a plurality of the linearly extending uneven portions 42 and 43 intersect each other at right angles, but uneven portions having a non-linear shape may be used, or the uneven portions may have a shape such that the uneven portions do not intersect each other.

Also, in the reinforcement structure S, a configuration may be adopted in which rigidity of the plate member 41 is not increased by the uneven portions 42 and 43 that change the shape of the plate member 41 itself as described in the above embodiment, but rather, rigidity of the plate member 41 is increased by fixing a long member separate from the plate member 41 to the plate member 41, for example.

2. In the above embodiment, a multipurpose work vehicle is described as an example of a work vehicle, but the present invention can be applied to various types of work vehicles equipped with an engine E, and is not limited to a multipurpose work vehicle.

3. The configurations disclosed in the above embodiments (including the other embodiments, the same applies hereinafter) can be applied in combination with a configuration disclosed in another embodiment as long as there is no contradiction. Furthermore, the embodiments disclosed in the present specification are merely examples. The embodiments of the present invention are not limited by these examples, and can be appropriately modified within a range that does not depart from the object of the present invention.

4. The present invention can be used for an engine cover that can appropriately cover the upper portion of an engine and a work vehicle provided with this engine cover.

Second Embodiment

Exemplary embodiments of a work vehicle according to the present invention will be described below with reference to the drawings.

In the description of the present embodiment, the front-rear direction and the left-right direction are described as follows, unless otherwise specified. That is, the traveling direction on the forward side (see arrow F in FIGS. 6 and 7) during work travel of the work vehicle to which the present invention is applied is referred to as "front", and the traveling direction to the backward side (see arrow B in FIGS. 6 and 7) is referred to as "rear". The direction corresponding to the right side with reference to the forward attitude in the front-rear direction (see arrow R in FIG. 8) is referred to as "right", and the direction similarly corresponding to the left side (see arrow L in FIG. 8) is referred to as "left".

Overall Configuration

Here, a case will be described where the present invention is applied to a utility vehicle (corresponding to a multipurpose vehicle) serving as an example of a work vehicle.

Figure 6:
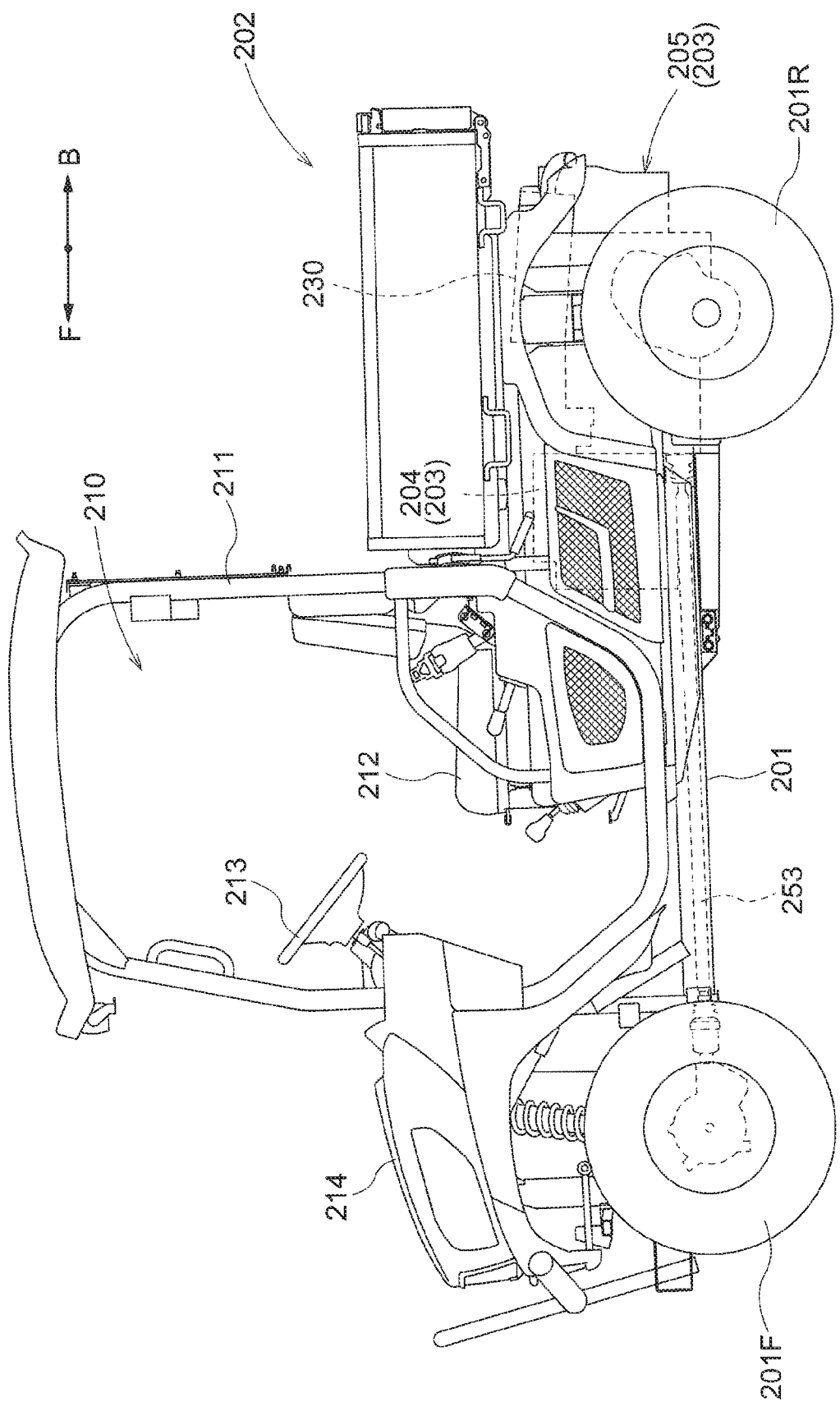
FIG. 6 shows a second embodiment (the same below through FIG. 13), and is a left side view of a utility vehicle in which the present invention is applied.
Figure 7:
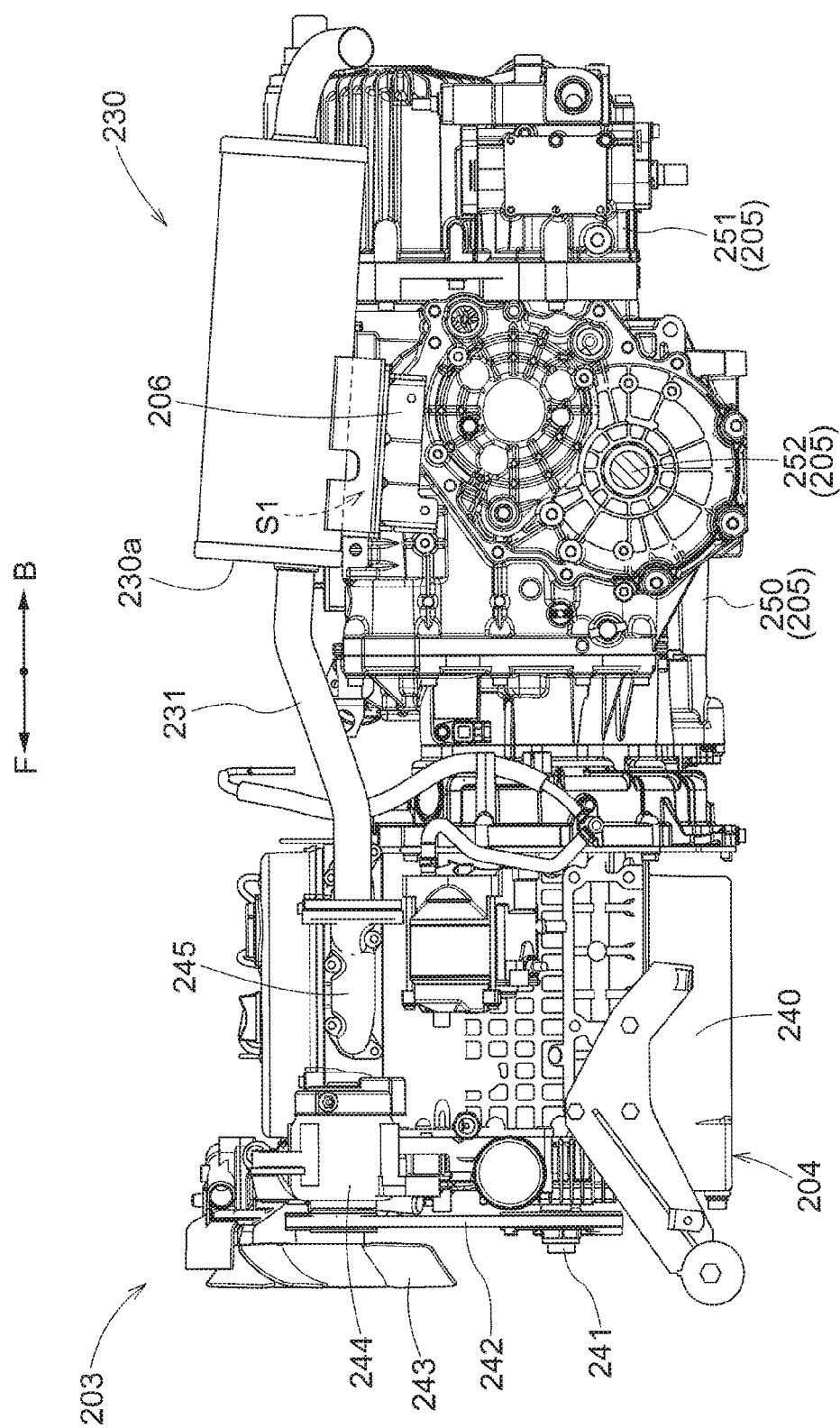
FIG. 7 shows a left side view showing an engine, a transmission and an exhaust gas treatment device in a motive portion of part one of the second embodiment.

As shown in FIGS. 6 and 7, the utility vehicle is provided with a steerable left-right pair of front wheels 201F (corresponding to a traveling device) at the front of a vehicle frame 201 forming a framework of a traveling vehicle. At the rear of the vehicle frame 201, a left-right pair of unsteerable rear wheels 201R (corresponding to a traveling device) are supported.

A driving portion 210 is provided on the upper side of the vehicle frame 201 at the center in the front-rear direction of the traveling vehicle. A loading platform 202 is provided on the upper side of the vehicle frame 201 at the rear of the traveling vehicle, and a motive portion 203 is provided at a position below the loading platform 202.

Driving force from an engine 204 and a transmission 205 provided in a motive portion 203 described later can be transmitted to the front wheels 201F and the rear wheels 201R. As a result, the utility vehicle is configured as a four-wheel drive vehicle that performs four-wheel drive travel, and is used for multipurpose work such as farming and transportation. A ROPS frame 211 that protects the driving portion 210 is provided at a position surrounding the driving portion 210.

The loading platform 202 has a function of being able to dump a load in a dumping manner by raising the front end side around the horizontal axis in the left-right direction at a position near the rear end of the loading platform 202, and the loading platform 202 is supported by the vehicle frame 201 so as to be capable of swinging around that horizontal axis. Also, a hydraulic actuator (not shown) that raises and lowers the front end side of the loading platform 202 is provided.

The driving portion 210 is provided with a driver seat 212 where a driver sits, a steering wheel 213 that controls steering of the front wheels 201F, and various operation controllers.

A passenger seat is disposed adjacent to the driver seat 212. In the space under the seat corresponding to the lower side of the driver seat 212, an oil cooler (not shown) disposed at a position cooled by a cooling fan 243 of a diesel engine 204 described later, an air passage for introducing outside air to the oil cooler, a battery device (not shown), and the like are disposed.

Structure of Motive Portion

Figure 8:
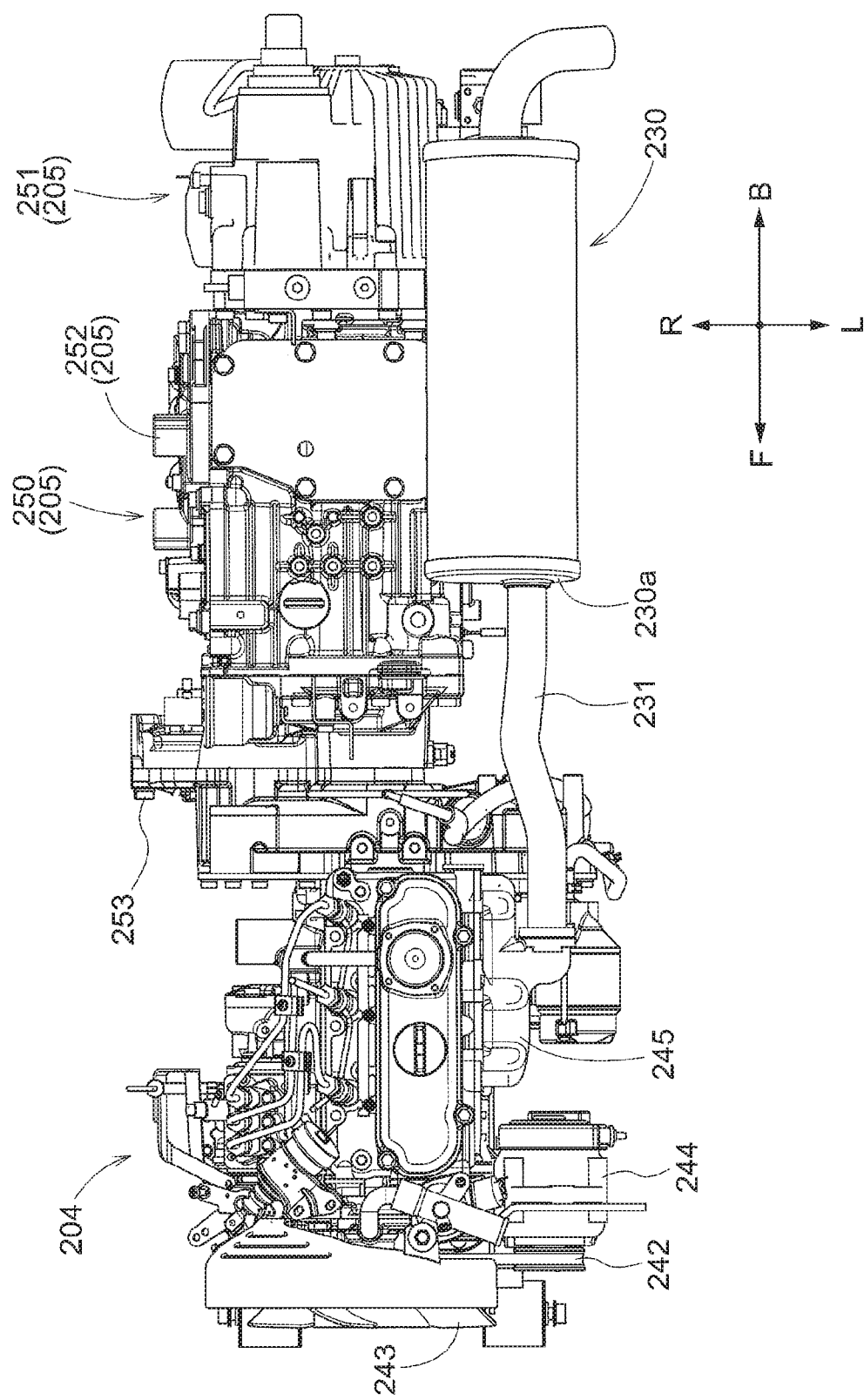
FIG. 8 shows a plan view showing the engine, the transmission and the exhaust gas treatment device in the motive portion of part one of the second embodiment.
Figure 9:
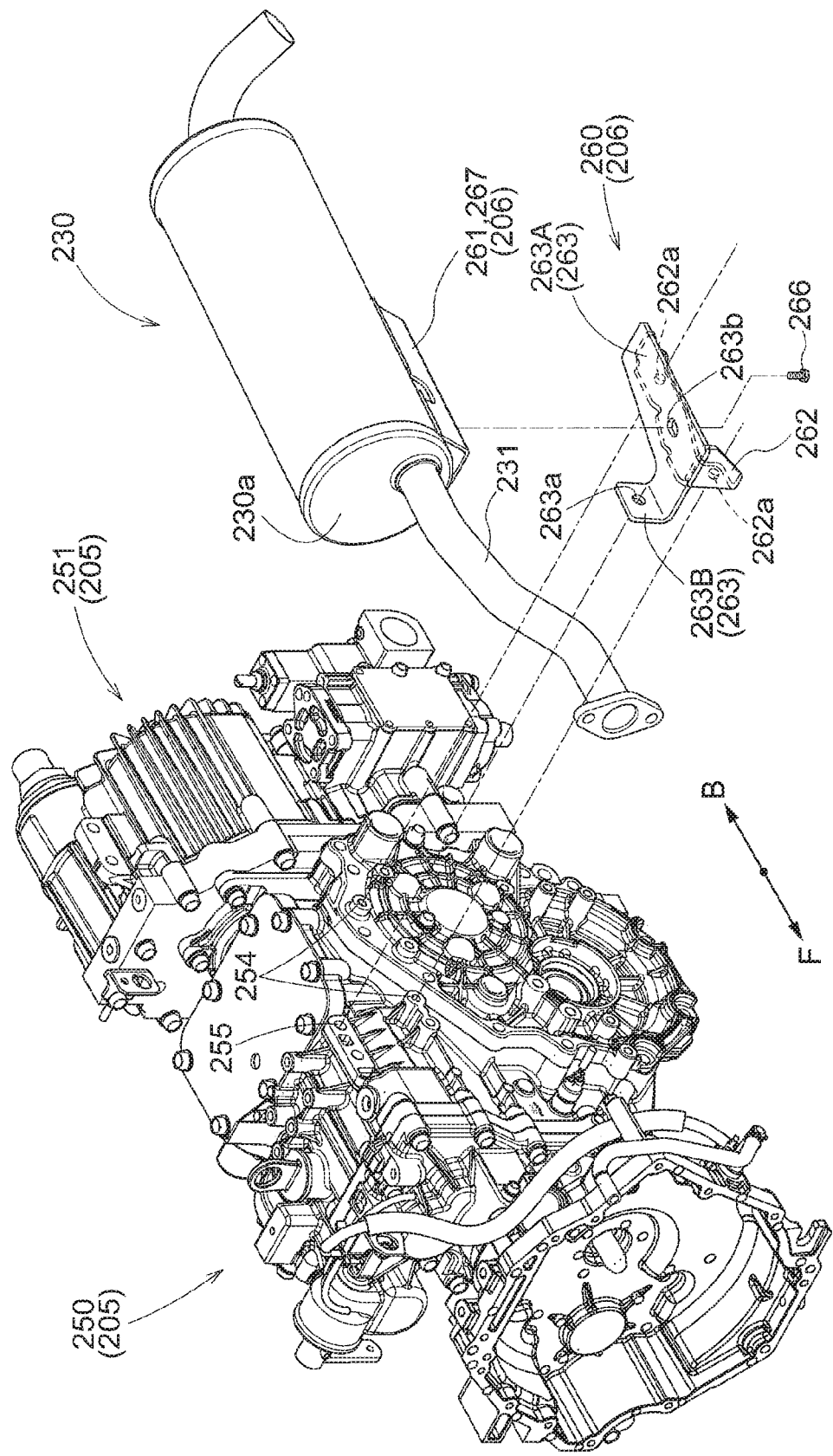
FIG. 9 shows an exploded perspective view showing the transmission and the exhaust gas treatment device in the motive portion of part one of the second embodiment.

As shown in FIGS. 7 to 9, the motive portion 203 includes the water-cooled diesel engine 204 (hereinafter simply referred to as the engine) as an internal combustion engine, and the transmission 205 (corresponding to a fixed portion integrated with the engine) fixed to the engine 204. A radiator (not shown) for water cooling the engine 204 is disposed inside a front hood 214 at the front of the vehicle.

The motive portion 203 including the engine 204 and the transmission 205 mentioned above is formed between the vehicle frame 201 and the loading platform 202 disposed on the rear side of the driving portion 210 on the vehicle frame.

The transmission 205 includes a transmission case 250 in which a gear transmission (not shown) is installed, and a hydrostatic continuously variable transmission 251. The transmission case 250 is connected and fixed to the rear of the engine 204, and the hydrostatic continuously variable transmission 251 is connected and fixed to the rear of the transmission case 250.

The engine 204 is provided with a crankshaft (not shown) along the front-rear direction of the vehicle, and power is transmitted from a front output shaft 241 protruding forward of an engine body 240 through a fan belt 242 to a cooling fan 243 and an alternator 244. The cooling fan 243 introduces outside air, and sends out hot air remaining in the oil cooler and in the upper space of the engine 204 positioned to the rear, and also brings the blown outside air into contact with an exhaust gas treatment device 230 described later, thereby performing air cooling.

Power is transmitted to a traveling system and a work system from an output shaft (not shown) extended rearward from the rear of the engine 204. That is, although not shown, the output from the engine 204 is shifted by the continuously variable transmission 251 as the main transmission in the transmission 205, and further shifted by the gear transmission as an auxiliary transmission, and then power is transmitted to the left and right rear wheels 201R through a rear axle 252 protruding from the transmission case 250 to both left and right sides. Power is transmitted to the front wheels 201F through a transmission shaft 253 extended forward from the lower portion of the transmission case 250.

The above embodiment is a common embodiment according to the present invention, and below, a support structure of the exhaust gas treatment device 230 will be described in part one and part two of the second embodiment.

First, part one of the second embodiment will be described.

Exhaust Gas Treatment Device of Part One of Second Embodiment

As shown in FIGS. 7 and 8, the motive portion 203 is provided with the exhaust gas treatment device 230 that purifies the exhaust gas of the engine 204. The exhaust gas treatment device 230 is configured using a diesel particulate filter (DPF) that collects and removes particulate matter mainly containing carbon contained in the exhaust gas.

The exhaust gas treatment device 230 is configured to perform a regeneration treatment of heating, burning and removing collected particulate matter in order to prevent a decrease in the collection function caused by the accumulation of collected particulate matter. As a result, regardless of whether the engine speed of the engine 204 is high or low, the temperature of the exhaust gas discharged during the regeneration treatment is higher than the temperature of exhaust gas of an ordinary engine.

As shown in FIGS. 7 and 8, the exhaust gas treatment device 230 is attached to the transmission 205, which is a fixed portion integrated with the engine 204, through a mounting support 206.

The mounting support 206 is installed in the upper portion of the transmission case 250 such that the exhaust gas treatment device 230 is positioned to the rear away from the engine 204. A front end portion 230a of the exhaust gas treatment device 230 is connected to an exhaust gas inlet pipe 231 in a state mounted to the mounting support 206.

The front end of the exhaust gas inlet pipe 231 is connected to an exhaust manifold 245 of the engine 204.

In this mounted state, the exhaust gas treatment device 230 is in an attitude in which the longitudinal direction is along the front-rear direction, and the exhaust gas inlet pipe 231 is also disposed in a posture in which the pipe longitudinal direction is substantially along the front-rear direction.

The mounting support 206 includes a mounting portion 260 that can be bolted to the upper left portion of the transmission case 250, and a connecting portion 261 that is detachable from the mounting portion 260 and is fixed to the exhaust gas treatment device 230.

The mounting portion 260 includes a bent channel-shaped lower plate 262 whose front and rear end portions protrude laterally outward in plan view, and an upper plate 263 having a flat face portion 263A intersecting the upper end edge of the lower plate 262. The flat face portion 263A of the upper plate 263 is fixed by welding to the upper end edge of the lower plate 262.

The lower plate 262 is provided with a pair of front and rear first bolt insertion holes 262a through which connection bolts 264, screwed into a pair of front and rear lower screw holes 254 formed on the left side face of the transmission case 250, can be inserted. The first bolt insertion holes 262a and the lower screw holes 254 are formed at two locations separated by a distance L1 in the front-rear direction.

In the upper plate 263, in the outer peripheral edge of the flat face portion 263A, a standing piece portion 263B that stands upward is formed at the end closer to the left side face of the transmission case 250. A second bolt insertion hole 263a, where a connection bolt 264 that is screwed into an upper screw hole 255 formed at a position higher than the lower screw hole 254 formed on the left side face of the transmission case 250 can be inserted, is formed in the standing piece portion 263B. The second bolt insertion hole 263a and the upper screw hole 255 are formed at positions higher than the first bolt insertion hole 262a and the lower screw hole 254 by a height H1 in the vertical direction.

Also, the second bolt insertion hole 263a and the upper screw hole 255, in the left-right direction as well, are biased toward the center side in the left-right direction of the transmission case 250 by a horizontal width W1 relative to the first bolt insertion hole 262a and the lower screw hole 254.

The connecting portion 261 is formed in approximately a V shape, which is provided with a flat portion 261A facing the flat face portion of the mounting portion 260, and at a position facing the lower half side of the cylindrical exhaust gas treatment device 230, an upward spreading inclined plate portion 261B whose width in the left-right direction increases toward the upper side.

Figure 10:
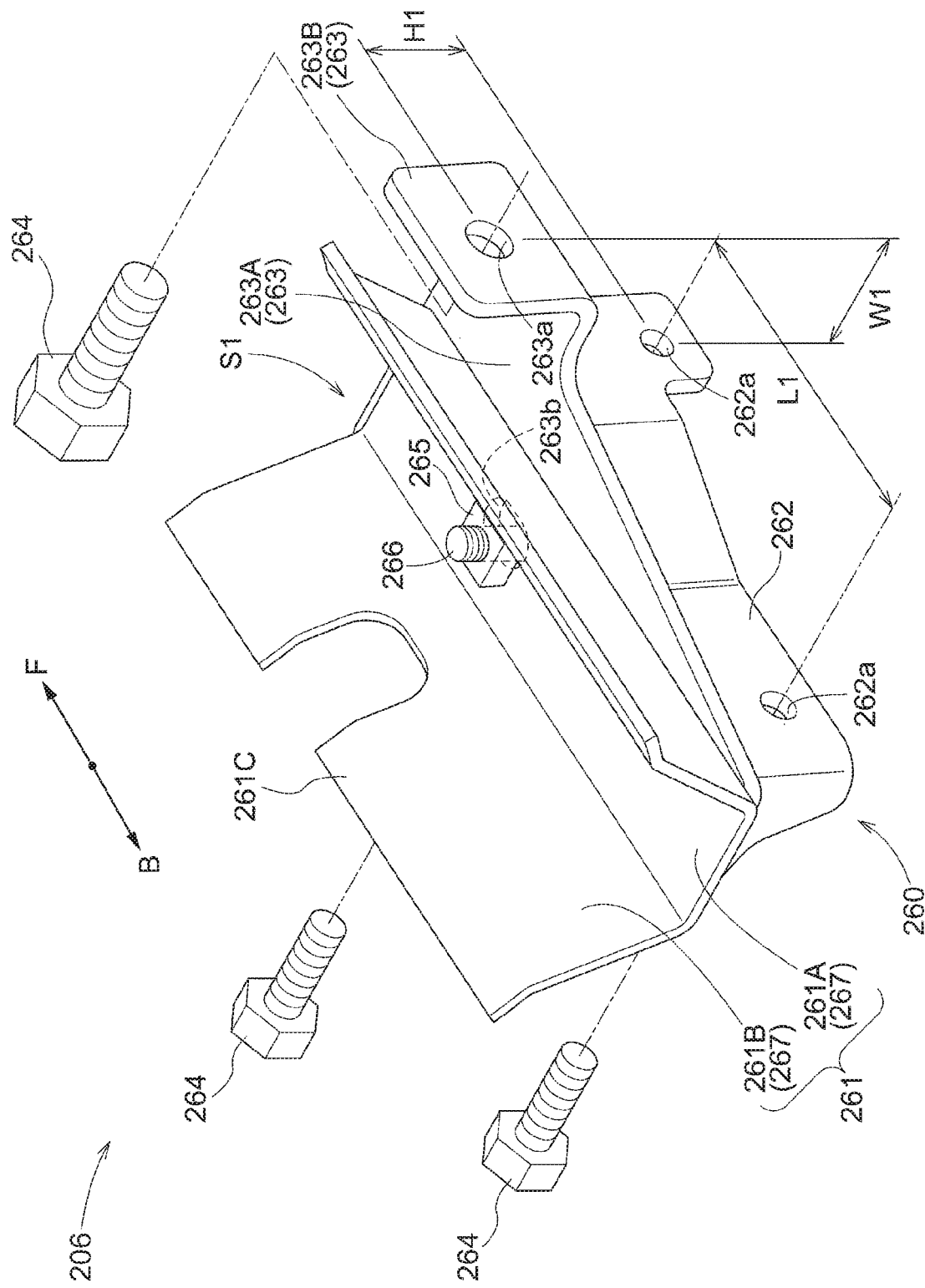
FIG. 10 shows a perspective view showing a mounting support of part one of the second embodiment.

A welding nut 265 provided on the flat plate portion 261A is located at a position facing an elongated connecting hole 263b (see FIGS. 9 and 10) having an elongated diameter in the front-rear direction provided on the flat face portion 263A of the mounting portion 260, and is capable of connection or disconnection through a connecting bolt 266 passing through the elongated connecting hole 263b from below.

An upper end edge 261C of the upward spreading inclined plate portion 261B in the connecting portion 261 is fixed by welding to the lower half side of the cylindrical exhaust gas treatment device 230.

As described above, the connecting portion 261 provided at a position facing the lower half side of the cylindrical exhaust gas treatment device 230 covers the lower half side of the cylindrical exhaust gas treatment device 230, and forms a space S1 where outside air can flow between the outer peripheral face of the exhaust gas treatment device 230 and the outer face of the transmission case 250.

Thus, the flat plate portion 261A of the connecting portion 261 and the upward spreading inclined plate portion 261B fulfill a role as the connecting portion 261 of the mounting support 206, and also function as a heat shielding plate 267 that suppresses conduction of radiant heat between the transmission case 250 and the exhaust gas treatment device 230.

Next, part two of the second embodiment will be described based on FIGS. 11 to 13.

Exhaust Gas Treatment Device of Part Two of Second Embodiment

The motive portion 203 is provided with the exhaust gas treatment device 230 in the exhaust gas discharge path of the engine 204. The exhaust gas treatment device 230 is configured using a silencing device (a muffler) including a muffling chamber for reducing exhaust noise of exhaust gas.

Thus, for the exhaust gas treatment device 230, it is possible to adopt a structure having a muffler, and this same structure can be adopted not only when the engine 204 is a diesel engine, but also when a gasoline engine is used.

Figure 11:
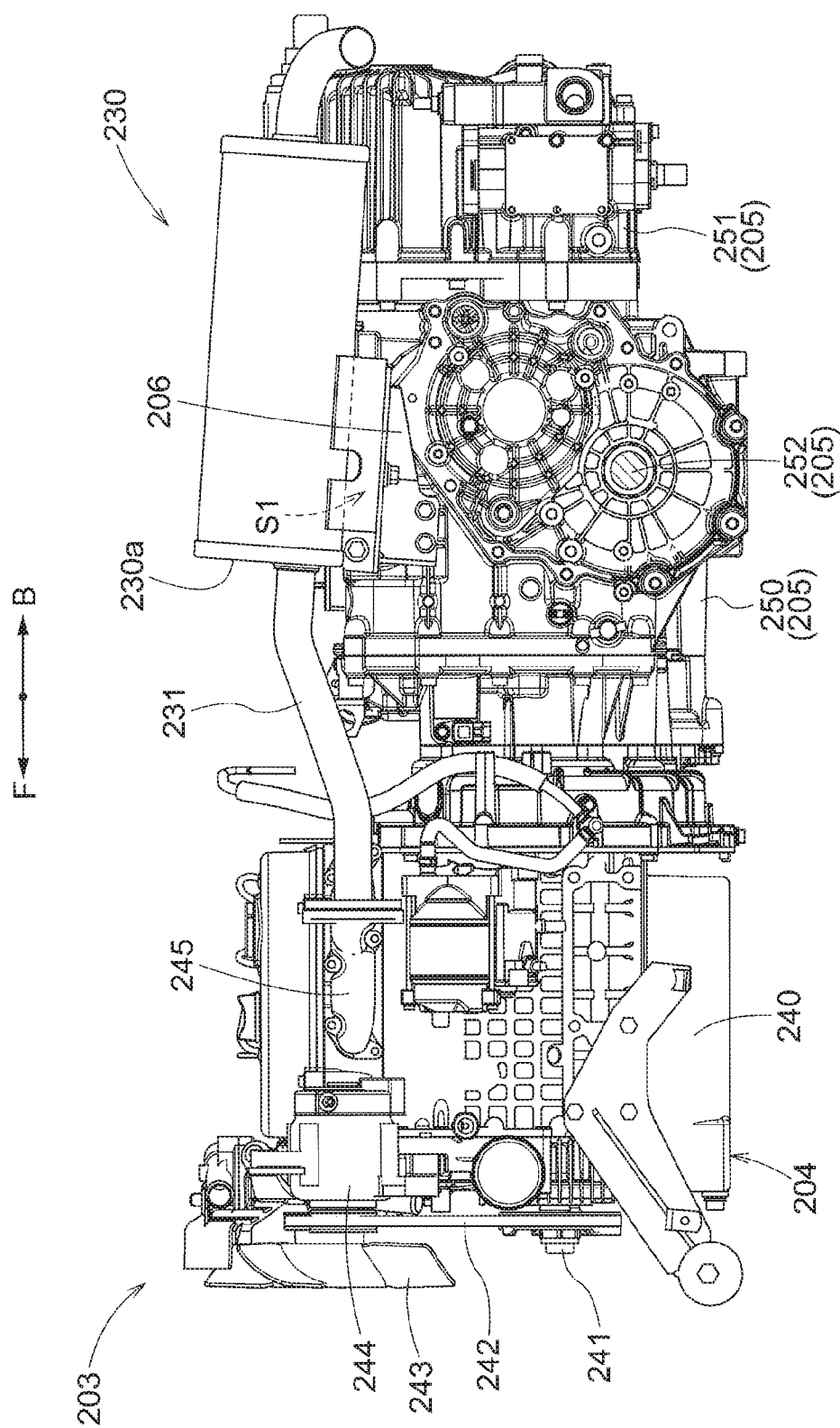
FIG. 11 shows a left side view showing the engine, the transmission and the exhaust gas treatment device in the motive portion of part two of the second embodiment.
Figure 12:
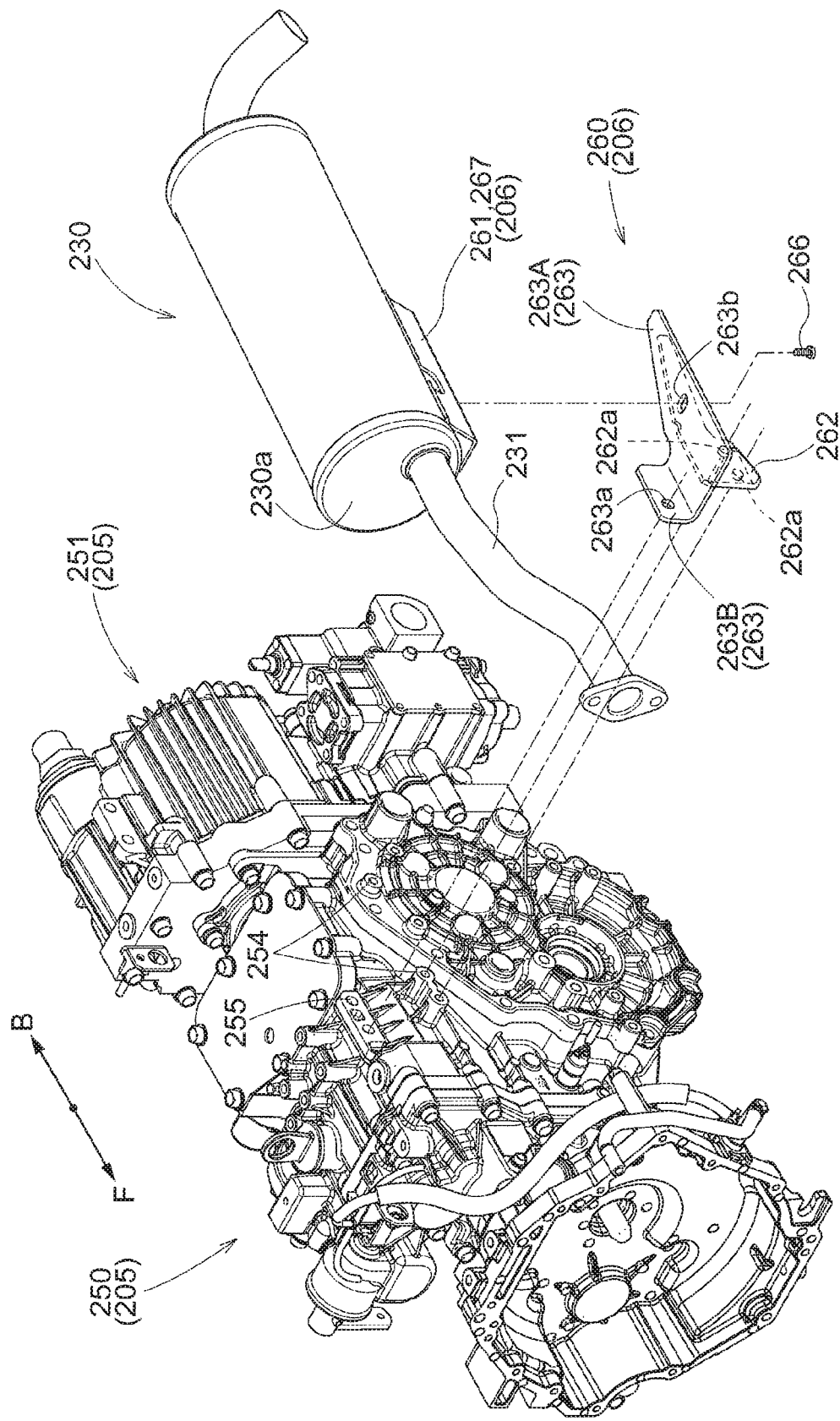
FIG. 12 shows an exploded perspective view showing the transmission and the exhaust gas treatment device in the motive portion of part two of the second embodiment.
Figure 13:
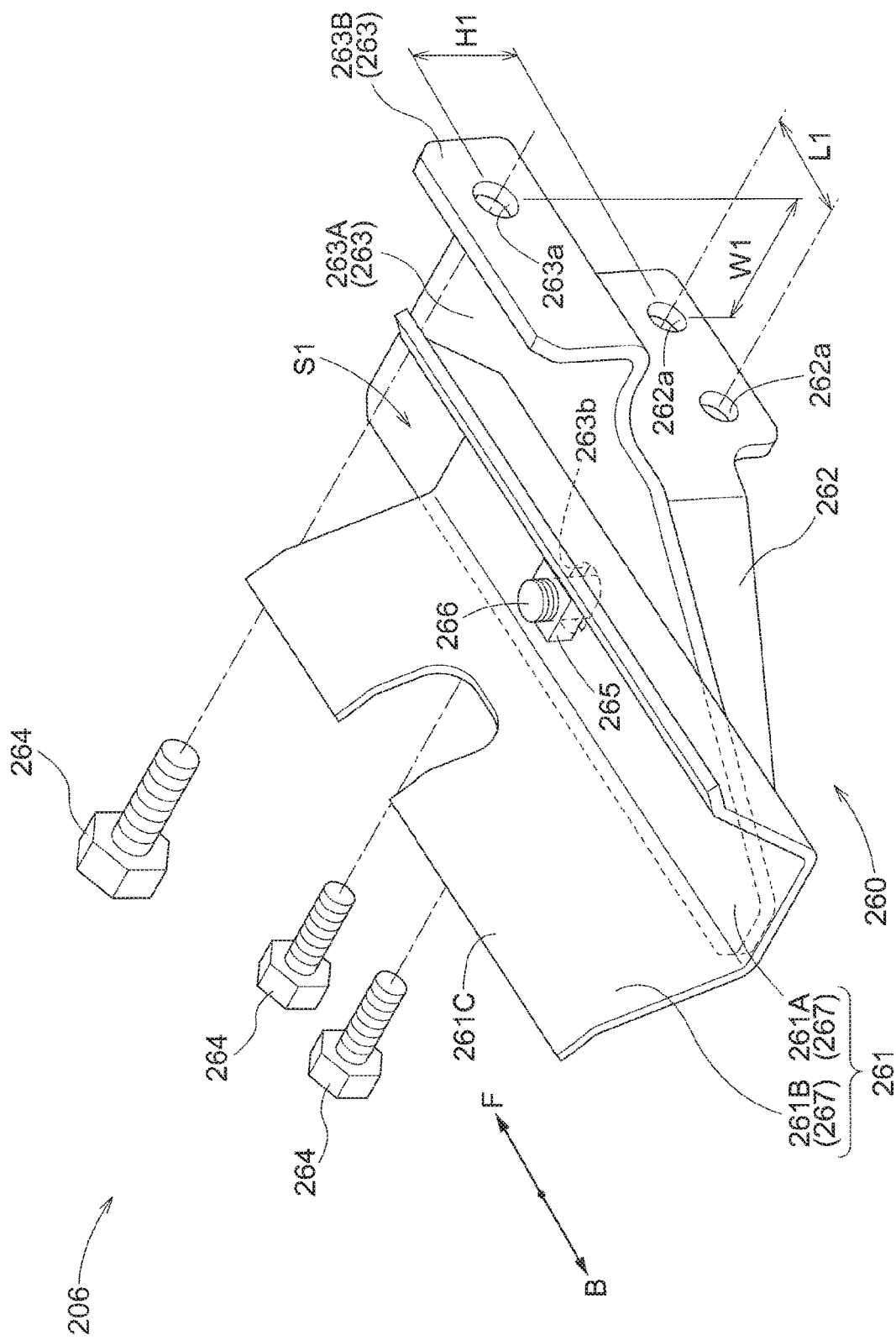
FIG. 13 shows a perspective view showing a mounting support of part two of the second embodiment.

As shown in FIGS. 11 to 13, the exhaust gas treatment device 230 is attached to the transmission 205, which is a fixed portion integrated with the engine 204, through the mounting support 206.

The mounting support 206 is installed in the upper portion of the transmission case 250 such that the exhaust gas treatment device 230 is positioned to the rear away from the engine 204. The front end portion 230*a* of the exhaust gas treatment device 230 is connected to the exhaust gas inlet pipe 231 in a state mounted to the mounting support 206. The front end of the exhaust gas inlet pipe 231 is connected to the exhaust manifold 245 of the engine 204.

In this mounted state, the exhaust gas treatment device 230 is in an attitude in which the longitudinal direction is along the front-rear direction, and the exhaust gas inlet pipe 231 is also disposed in a posture in which the pipe longitudinal direction is substantially along the front-rear direction.

The mounting support 206 includes the mounting portion 260 that can be bolted to the upper left portion of the transmission case 250, and the connecting portion 261 that is detachable from the mounting portion 260 and is fixed to the exhaust gas treatment device 230.

The mounting portion 260 includes the bent channel-shaped lower plate 262 whose front and rear end portions in a vertical wall portion along the front-rear direction protrude laterally outward in plan view, and the upper plate 263 having the flat face portion 263A intersecting the upper end edge of the lower plate 262. The flat face portion 263A of the upper plate 263 is fixed by welding to the upper end edge of the lower plate 262.

The lower plate 262 is provided with the pair of front and rear first bolt insertion holes 262*a* through which the connection bolts 264, screwed into the pair of front and rear lower screw holes 254 formed on the left side face of the transmission case 250, can be inserted. The first bolt insertion holes 262*a* and the lower screw holes 254 are formed at two locations separated by the distance L1 in the front-rear direction. In part two of the second embodiment, the distance L in the front-rear direction between the lower screw holes 254 and between the first bolt insertion holes 262*a* is formed shorter than the distance L1 in the front-rear direction between the first bolt insertion holes 262*a* in the mounting portion 260 of the structure described in part one of the second embodiment.

In the upper plate 263, in the outer peripheral edge of the flat face portion 263A, the standing piece portion 263B standing upward is formed at the end closer to the left side face of the transmission case 250. The second bolt insertion hole 263*a*, where the connection bolt 264 that is screwed into the upper screw hole 255 formed at a position higher than the lower screw hole 254 formed on the left side face of the transmission case 250 can be inserted, is formed in the standing piece portion 263B. The second bolt insertion hole 263*a* and the upper screw hole 255 are formed at positions higher than the first bolt insertion hole 262*a* and the lower screw hole 254 by the height H1 in the vertical direction.

Also, the second bolt insertion hole 263*a* and the upper screw hole 255, in the left-right direction as well, are biased toward the center side in the left-right direction of the transmission case 250 by the horizontal width W1 relative to the first bolt insertion hole 262*a* and the lower screw hole 254.

The connecting portion 261 is formed in approximately a V shape, which is provided with the flat portion 261A facing the flat face portion of the mounting portion 260, and at a position facing the lower half side of the cylindrical exhaust gas treatment device 230, the upward spreading inclined plate portion 261B whose width in the left-right direction increases toward the upper side.

The welding nut 265 provided on the flat plate portion 261A is located at a position facing the elongated connecting hole 263*b* (see FIG. 12) having an elongated diameter in the left-right direction provided on the flat face portion 263A of the mounting portion 260, and is capable of connection or disconnection through the connecting bolt 266 passing through the elongated connecting hole 263*b* from below.

The upper end edge 261C of the upward spreading inclined plate portion 261B in the connecting portion 261 is fixed by welding to the lower half side of the cylindrical exhaust gas treatment device 230.

As described above, the connecting portion 261 provided at a position facing the lower half side of the cylindrical exhaust gas treatment device 230 covers the lower half side of the cylindrical exhaust gas treatment device 230, and forms the space S1 where outside air can flow between the outer peripheral face of the exhaust gas treatment device 230 and the outer face of the transmission case 250.

Thus, the flat plate portion 261A of the connecting portion 261 and the upward spreading inclined plate portion 261B fulfill a role as the connecting portion 261 of the mounting support 206, and also function as the heat shielding plate 267 that controls conduction of radiant heat between the transmission case 250 and the exhaust gas treatment device 230.

Other Embodiment 1

In the above embodiment, the transmission case 250 of the transmission 205 is described as an example of a fixing portion integrated with the engine 204, which is attached to the mounting support 206. However, this is not a limitation of the present invention. For example, the hydrostatic continuously variable transmission 251 of the transmission 205, another engine accessory, or the engine 204 itself may be attached to the mounting support 206.

Regarding the configuration of other components, the same configuration as in the embodiment described above may be adopted.

Other Embodiment 2

In the above embodiment, a structure configured with the mounting portion 260 and the connecting portion 261 detachable from the mounting portion 260 is described as an example of the mounting support 206. However, this is not a limitation of the present invention. For example, the mounting support 206 may be configured with the mounting portion 260 and the connecting portion 261 integrated as a single body.

Regarding the configuration of other components, the same configuration as in the embodiment described above may be adopted.

Other Embodiment 3

In the above embodiment, an example is described in which the mounting support 206 is a structure used with the motive portion 203 provided between the vehicle frame 201, the driving portion 210 disposed to the front side above the vehicle frame 201, and the loading platform 202 disposed to the rear side of the driving portion above the vehicle frame 202. However, this is not a limitation of the present invention. For example, the mounting support 206 can also be used at a location where height is not restricted by the loading platform 202, or a location such that the position where the mounting support 206 is disposed is not restricted in the front-rear direction by the driving portion 210.

Regarding the configuration of other components, the same configuration as in the embodiment described above may be adopted.

Other Embodiment 4

In the above embodiment, a structure provided with the front wheels 201F and the rear wheels 201R is described as an example of a traveling device. However, this is not a limitation of the present invention. For example, a crawler traveling device may be adopted instead of any one of the front wheels 201F and the rear wheels 201R, or a crawler traveling device may be adopted instead of both the front wheels 201F and the rear wheels 201R.

Regarding the configuration of other components, the same configuration as in the embodiment described above may be adopted.

Other Embodiment 5

The present invention is not limited to use in utility vehicles, and is also applicable to various work vehicles such as lawn mowers, transport vehicles, agricultural machines, or the like.

DESCRIPTION OF REFERENCE SIGNS

22: constituent member
37: cooling fan
38: fan belt
40: engine cover
41: plate member
41a: horizontal portion
41b: downward portion
41c: upward peripheral edge portion
42: uneven portion (reinforcement structure 5)
43: uneven portion (reinforcement structure 5)
E: engine
201: vehicle frame
201F: front wheel (traveling device)
201R: rear wheel (traveling device)
202: loading platform
203: motive portion
205: transmission
204: engine
206: mounting support
210: driving portion
230: exhaust gas treatment device
231: exhaust gas inlet pipe
245: exhaust manifold
260: mounting portion
261: connecting portion
267: heat shielding plate

What is claimed is:

1. A work vehicle, comprising:
   a motive portion having an engine and an exhaust gas treatment device connected to an exhaust manifold of the engine,
   wherein the exhaust gas treatment device is connected to a fixing portion integrated with the engine through a mounting support,
   the mounting support is provided with a mounting portion connectable to the fixing portion, a connecting portion that connects the exhaust gas treatment device, and a heat shielding plate that suppresses conduction of radiant heat between the fixing portion and the exhaust gas treatment device, and
   the bottom of the exhaust gas treatment device is supported by the mounting support in a state where the heat shielding plate faces a lower half side of the exhaust gas treatment device.

2. The work vehicle according to claim 1,
   wherein the motive portion is provided between a vehicle frame supported by a traveling device, a driving portion disposed to a front side above the vehicle frame, and a loading platform disposed to a rear side of the driving portion above the vehicle frame.

3. The work vehicle according to claim 1,
   wherein the engine is disposed at the front of the motive portion, and a transmission is installed in a continuous manner to the rear of the engine,
   the exhaust gas treatment device is disposed above the transmission at a position to the rear away from the engine, and
   the mounting support is attached to the transmission.

4. The work vehicle according to claim 1,
   wherein the exhaust gas treatment device is disposed such that a longitudinal direction of the exhaust gas treatment device lies along a front-rear direction, and
   a front end portion of the exhaust gas treatment device is connected to the exhaust manifold by an exhaust gas inlet pipe along the front-rear direction.

5. The work vehicle according to claim 1,
   wherein the exhaust gas treatment device is provided with a silencing device.

* * * * *